Jan. 16, 1968  E. A. GLOS II  3,363,773
FILTER APPARATUS
Filed April 9, 1965
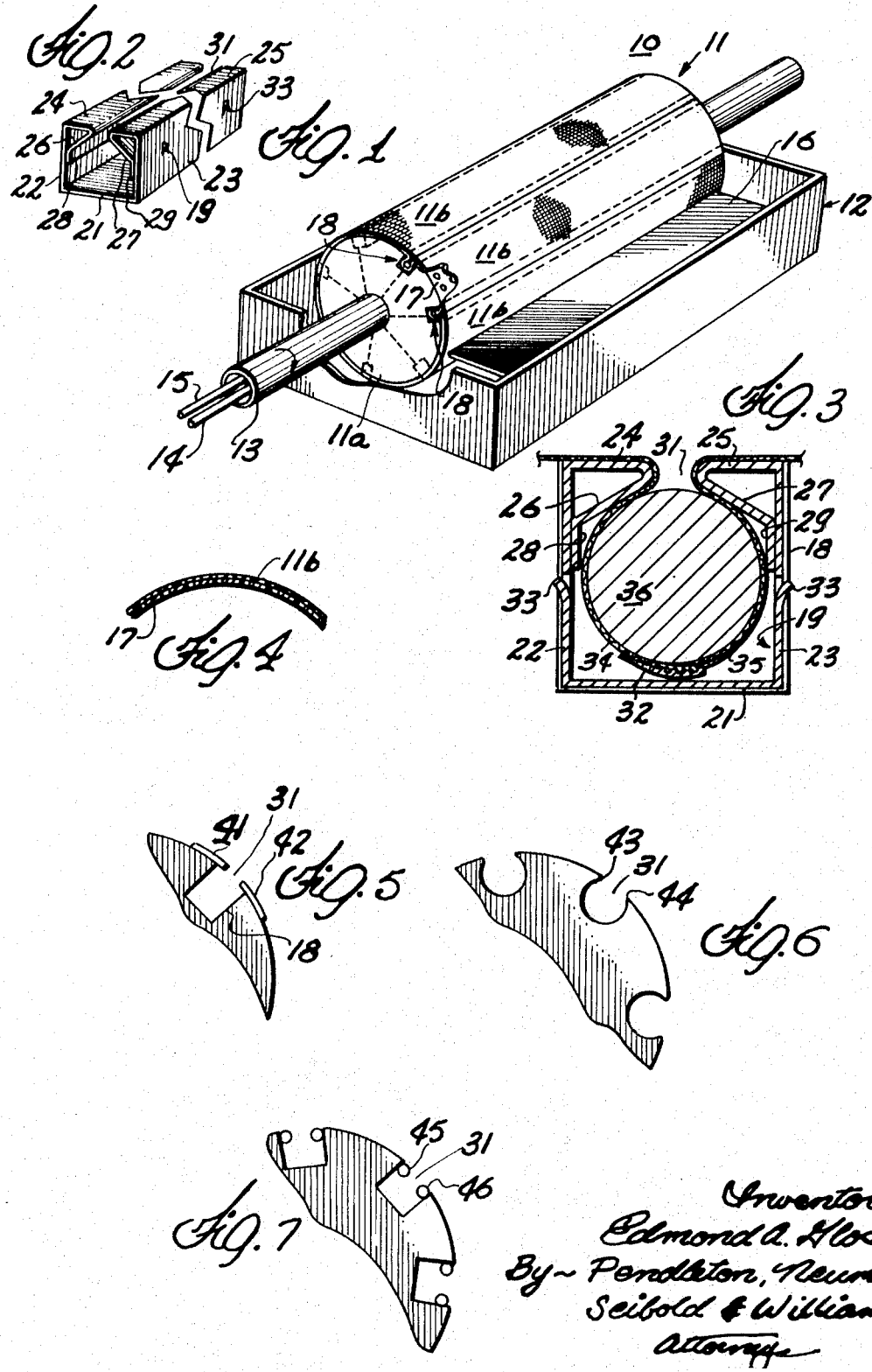
Inventor
Edmond A. Glos II
By Pendleton, Neuman
Seibold & Williams
Attorneys though double layers of filter cloth panels 11b. The channel member 19 is greater in transverse dimension than the entryway 31 for purposes that will appear.

3,363,773
FILTER APPARATUS
Edmond A. Glos II, Deerfield, Ill., assignor to Mero & Company, Inc., Chicago, Ill., a corporation of Illinois
Filed Apr. 9, 1965, Ser. No. 446,947
2 Claims. (Cl. 210—402)

ABSTRACT OF THE DISCLOSURE

Means for removably attaching a web of filter material to a filter drum whereby individual segments of the filter material may be removed and replaced independently of the other segments.

---

This invention relates to drum filters or the like, more particularly to means for attaching the filtering cloth or other filtering media to the drum.

It has been one form of practice in large filtering apparatus such, for example, as is used in the mining industry, to attach rectangular panels of filter cloth to each other and to the filtering drum. The rectangular panels of filter cloth after attachment to each other, for example, as by sewing or stitching were applied to the surface of the drum by disposing the seam in a longitudinally extending groove on the cylindrical surface and tightly tamping a rope (caulking) for example, into the groove exteriorly of the filter cloth. After the filtering canvas was attached to the drum, as indicated, the drum was slowly rotated with a portion of its periphery disposed in the solution to be filtered. By appropriate means vacuum was applied to that portion of the inner surface of the filtering drum whose canvas panels were immersed in the solution so as to cause the particles in the solution to adhere to the canvas surface. Continuing rotation, those panels upon which filtered material or residue had deposited to form a cake, moved out into the atmosphere and were slowly dried. Upon further rotation of the drum the filter cake on the canvas was scraped off or was caused to flake off by the application of reverse pressure or both. Still further rotation of the drum caused the filter cloth to be again immersed in the solution and the process to be repeated.

The described cycle of events was continued until the filter cloth deteriorated whereupon a particular panel (or panels) was removed and a new one substituted. The replacement of each worn-out filter cloth panel required removal of the rope caulking from two slots, cutting off of the old cloth panel, stitching in of a new cloth panel, and recaulking. All of these operations were time consuming, and inefficient, and it is an object of the invention to provide improved apparatus for attaching filter cloths to a filter drum or the like whereby the panels of filter cloth may be readily attached to each other and to the filter drum.

It is a further object of the invention to provide improved means whereby filter drums which are used in current practice may be modified so as to permit the simpler and more efficient attachment thereto of filter cloth or other media, according to the invention.

Other objects will become apparent as the description proceeds.

In carrying out the invention in one form there are provided in combination; means for attaching a web of filtering material to a filter drum or the like comprising an elongate channel extending longitudinally in the surface of the drum within which channel an elongate segment of the web of filtering material is to be received; a narrow entryway at the mouth of the channel through which connecting portions of the web segment are to extend, and an elongated retaining member for disposition in the channel between the entryway and the web segment, the retaining member being greater in transverse dimension than the transverse dimension of the entryway.

For a more complete understanding of the invention reference should be had to the accompanying drawings in which, FIG. 1 is a perspective view of filtering apparatus embodying the invention;

FIG. 2 is a perspective view of one component of the invention;

FIG. 3 is a fragmentary sectional view on an enlarged scale, showing various components of the invention in operative relation;

FIG. 4 is a fragmentary sectional view on an enlarged scale, showing portions of the apparatus in operative position, and FIGS. 5, 6 and 7 are partial end views of modified forms of one component of the invention.

Referring more particularly to the drawings, the invention is shown in FIG. 1 as embodying a filter apparatus 10, including a filter drum with attached filtering material 11, and a tank 12, for example, within which the solution containing the material to be filtered out is contained.

The filter drum mechanism 11 is adapted to be rotated on a shaft 13 which may be hollow in order that vacuum and pressure may be appropriately applied through pipes 14 and 15. As shown in FIG. 1, the drum mechanism 11 may be rotated clockwise with the lower portion of the drum mechanism immersed in the solution to be filtered. As is well-known in the art, the immersed portion of the filtering mechanism has vacuum applied to it for causing particles in the solution to adhere thereto. Upon emerging from the solution, the filter cake deposited upon the filter cloth will dry, and in the continued rotation of the drum will come opposite a scraper 16. Prior to the arrival of a particular portion of filter cake at the scraper a back pressure is usually applied through conduit 15 to break the filter cake loose, crack it, and otherwise loosen it. The filter cake falls off then or is scraped off by the scraper.

The filter drum and attached filtering material 11, i.e. canvas, as shown, consists of a drum proper 11a divided into sectors shown by dotted lines and a series of panels of filter cloth 11b, one each of which is disposed across the exterior surface of each sector. As is shown at 17 (FIGS. 1 and 4) the exterior surface of the drum 11a is perforated so vacuum or pressure, as may be desired, can be applied to the filter panels 11b through the conduits 14 and 15.

It is to the simplification of the removal of expended filter panels 11b and the placement of new panels that the subject invention is directed.

At the juncture of adjacent sectors at the periphery of the drum there is provided a longitudinally extending channel such as may be formed by a re-entrant wall 18 forming part of the drum periphery. Disposed within the channel formed by the walls 18 there is a channel member 19 (FIGS. 2 and 3).

The channel member 19 may be generally rectangular in cross section similar to that of the channel formed by walls 18 so as to fit snugly therein. The channel member 19 is of the same length as the channels within which it is received, and may be formed of sheet metal of desired thickness bent into the appropriate configuration. The channel member configuration, as shown, has a bottom wall 21, two side walls 22 and 23, top walls 24 and 25, and reversely bent portions 26 and 27, the latter terminating in lips 28 and 29, respectively, which may be welded to the side walls 22 and 23, if desired, for purposes of rigidity. The juncture of members 24 and 26 and the juncture of members 25 and 27 terminate close to each other but spaced apart so as to form a mouth or entryway 31 of sufficient width to easily receive two thicknesses of filtering material, such as canvas, and the quick connecting structure 32 for joining the two canvas portions together. Thereby expended filter cloths are quickly removable and equally quickly replaceable with new ones.

In existing apparatus having a drum mechanism already operating, channels will ordinarily exist in the drum surface to receive rope caulkings, but if not, they may be formed by any suitable means. To hold the channel member 19 firmly within its channel, spring protruding fingers 33 may project outwardly from each of the side walls 22 and 23 for engagement with the channel walls 18.

As many channels and corresponding channel members 19 disposed therein, as desired, are provided around the periphery of the drum at the junctures of the sectors as seen in FIG. 1. After all of the channel members 19 are disposed in position, the filter cloth panels are attached to the drum surface as may now be described. The ends 34 and 35 of two adjacent cloth panels 11b are first attached to each other by a slide fastener 32 such as described in the pending patent application Ser. No. 346,182, filed Feb. 20, 1964, and now abandoned to the same inventor. After the two panels are attached together the attached ends are disposed in the space interiorly of the channel member 19 and a retaining member, for example, a wooden rod 36 is pushed into the loop formed by the ends 34 and 35 of the filter panels. The rod 36, thereby, lies between the attached ends of the filter panels and the members 26 and 27 forming a pair of shoulders or abutments. The rod 36 which also may be of metal, plastic or the like, is substantially larger in diameter than the mouth 31 and, thus, cannot move outwardly thereof. The rod is placed in position by pushing it longitudinally through the channel member 19 while the ends of the filter cloth panels are appropriately disposed interiorly thereof. The connected ends of the filter cloth panels are therefore firmly but easily removably held within the channel.

After the filter cloth panels have become worn out and it is desired to replace them, the filter cake thereon is first removed, as has already been described. Thereafter, the rods 36 are removed and the ends of the filter cloth panels 34 and 35 pulled out through openings 31. By releasing the slide fasteners on two opposite sides of a particular filter cloth panel, that panel is then removed and a new one inserted in its place by the means of the slide fasteners. Finally, the new panels have their connected ends pushed through the openings 31 followed by reinsertion of the rods 36 and the apparatus again is in condition for operation.

In FIGS. 5, 6 and 7 there are shown additional structures for modifying existing filter drums in accordance with the invention.

In FIG. 5 a filter drum 11a is shown in end view with a channel which may be formed by walls 18 as already described. Longitudinal strips 41 and 42 may be attached along the outer edges of the channel formed by the walls 18, such for example as by welding in the event that the channel member is made of metal. The strips 41 and 42 are of sufficient width so as to lie along the surface of the cylinder a sufficient distance for firm attachment and the adjacent edges are disposed away from each other to form an opening 31 as already described and for the same purposes.

In FIG. 6, a similar end view is shown, and the channels in the periphery of the cylinder may be essentially circular in form whereby the intersections 43 and 44 between the channel walls and the periphery of the cylinder are disposed apart to form a mouth 31 for receiving the attached ends of filter panels.

In FIG. 7, the form is shown as consisting of a pair of longitudinally extending rods 45 and 46 attached to the walls of the channels immediately adjacent the outer periphery of the cylindrical drum. The surfaces of the rods 45 and 46 adjacent each other are spaced sufficiently apart so as to form an opening 31 through which the attached filter panels are received.

In each of the forms of FIGS. 4, 5 and 6, a rod similar to rod 36 shown in FIG. 3 would be used to hold the filter cloth panels in place.

While particular embodiments of the invention have been shown, it will be understood, of course, that the invention is not limited thereto since many modifications may be made, and it is, therefore, contemplated by the appended claims to cover any such modifications as fall within the true spirit and scope of the invention.

The invention having thus been described, what is claimed and desired to be secured by Letters Patent is:

1. Means for attaching connected portions of a web of filtering material to a filter drum having an elongate groove extending longitudinally beneath the general surface of the drum comprising an elongate channel member having sides disposed within said groove, means on the sides of said channel member engaging the sides of said elongate groove for holding said channel member in said elongate groove, a web having individually connected portions of filtering material with said connected portions disposed within said channel member, re-entrant means extending from the sides of said channel member forming a narrow entryway into said channel member through which said connected portions of said web segment extend, and an elongate retaining member disposed in said channel member between said entryway and the connected portions of the web in said channel member thereby holding the web within the elongate groove, said retaining member being greater in transverse dimension than the transverse dimension of said entryway.

2. The invention according to claim 1 wherein the means on the sides of said channel member comprises outwardly projecting spring fingers which engage the sides of the elongate groove.

References Cited

UNITED STATES PATENTS

| | | | |
|---|---|---|---|
| 2,744,708 | 5/1956 | Belford, Jr. | 24—213 X |
| 3,036,354 | 5/1962 | De Bie | 210—404 X |
| 3,300,052 | 1/1967 | Steintveit | 210—402 |

SAMIH N. ZAHARNA, *Primary Examiner.*